United States Patent
He et al.

(10) Patent No.: US 11,722,079 B2
(45) Date of Patent: Aug. 8, 2023

(54) DETECTION SYSTEM AND METHOD FOR ROTOR DYNAMIC TURN-TO-TURN SHORT CIRCUIT FAULT OF SYNCHRONOUS GENERATOR

(71) Applicant: NORTH CHINA ELECTRIC POWER UNIVERSITY (BAODING), Baoding (CN)

(72) Inventors: Yuling He, Baoding (CN); Minghao Qiu, Baoding (CN); Chenkai Sun, Baoding (CN); Mengya Jiang, Baoding (CN); Xinghua Yuan, Baoding (CN); Xiaolong Wang, Baoding (CN)

( * ) Notice: Subject to any disclaimer, the term of this patent is extended or adjusted under 35 U.S.C. 154(b) by 0 days.

(21) Appl. No.: 17/719,695

(22) Filed: Apr. 13, 2022

(65) Prior Publication Data
US 2022/0393625 A1    Dec. 8, 2022

(30) Foreign Application Priority Data

Jun. 4, 2021   (CN) .......................... 202110624205.7

(51) Int. Cl.
*H02P 9/00*    (2006.01)
(52) U.S. Cl.
CPC .................................. *H02P 9/006* (2013.01)

(58) Field of Classification Search
CPC .... H02P 9/006; H02P 2103/20; H02P 29/024; H02P 29/64; G01R 31/52; G01R 31/346; G01R 31/72
See application file for complete search history.

(56) References Cited

U.S. PATENT DOCUMENTS

| | | | |
|---|---|---|---|
| 9,716,456 B2* | 7/2017 | Maruyama | ............... H02K 1/26 |
| 2015/0311848 A1* | 10/2015 | Maruyama | .............. H02P 23/00 |
| | | | 318/490 |
| 2022/0393625 A1* | 12/2022 | He | .......................... H02P 29/64 |

* cited by examiner

*Primary Examiner* — Julio C. Gonzalez (57) ABSTRACT

A detection system and method for rotor dynamic turn-to-turn short circuit fault of synchronous generator are disclosed. The system includes a motor, a synchronous generator, a current transformer, an acquisition card, an infrared temperature sensor, a temperature acquisition instrument and a control terminal. The rotor winding dynamic turn-to-turn short circuit fault of synchronous generator is detected and located by measuring the double judgment standards of the temperature signal of rotor winding and the three-phase current signal of stator winding. The method is easy to operate and has high sensitivity. The detection and location process of the fault is efficient and reliable. The dynamic turn-to-turn short circuit fault can be detected in the early stage of the formation of rotor static turn-to-turn short circuit, so as to reduce the loss of power plant fault shutdown and better meet the needs of practical application.

6 Claims, 9 Drawing Sheets

DETECTION SYSTEM AND METHOD FOR ROTOR DYNAMIC TURN-TO-TURN SHORT CIRCUIT FAULT OF SYNCHRONOUS GENERATOR

CROSS REFERENCE TO RELATED APPLICATION

This patent application claims the benefit and priority of Chinese Patent Application No. 202110624205.7 filed on Jun. 4, 2021, the disclosure of which is incorporated by reference herein in its entirety as part of the present application.

TECHNICAL FIELD

The present disclosure relates to the technical field of equipment condition monitoring and testing, and more specifically, to a detection system and method for rotor dynamic turn-to-turn short circuit fault of synchronous generator.

BACKGROUND ART

At present, rotor turn-to-turn short circuit fault is a common fault in generator operation. When the rotor turn-to-turn short circuit fault occurs, the generator terminal voltage decreases due to insufficient excitation. In order to maintain the stability of the power grid, the measures of increasing the excitation current of the rotor are adopted, and the reactive power increases accordingly. When the fault occurs to a certain extent, it may burn the journal and bearing bush, and there is a risk of magnetizing the spindle, and even lead to the grounding shutdown fault of the generator, which has a bad impact on the stability of the power grid and the operation of the power plant.

Rotor turn-to-turn short circuit is divided into rotor static turn-to-turn short circuit and rotor dynamic turn-to-turn short circuit. The rotor static turn-to-turn short circuit refers to that when the generator is running at a speed increase or stable state, it is accompanied by the unit vibration, causing the wire turns of the generator rotor excitation winding to rub against each other, resulting in insulation damage. When the wire turns contact at the damaged position, the rotor static turn-to-turn short circuit occurs.

Rotor dynamic turn-to-turn short circuit means that the wire turns of excitation winding may be subjected to centrifugal force during rotor rotation, and the contact at the damaged insulation of wire turns leads to turn-to-turn short circuit fault. When the rotor speed decreases and the centrifugal force on the winding decreases, the turns of the contacting wire turns are separate and the turn-to-turn short circuit fault disappears, so that it is not easy to find the dynamic turn-to-turn short circuit fault when the rotor turn-to-turn short circuit fault is detected during shutdown. The other is the phenomenon of single or periodic turn-to-turn short circuit of rotor winding with the change of rotor speed or other vibration characteristics. The above two situations belong to rotor dynamic turn-to-turn short circuit fault, and the fault belongs to the initial stage of rotor static turn-to-turn short circuit. When the fault occurs, it is accompanied by strong short circuit pulse, which affects the stability of generator terminal voltage. For a long time, this fault develops into a stable rotor turn-to-turn short circuit fault, damage the benefits of power plant and damage the stability of power grid. However, the detection efficiency and reliability of the existing rotor dynamic turn-to-turn short circuit fault detection methods of generator are difficult to meet the needs of practical application.

Therefore, how to provide an efficient and reliable detection method for rotor dynamic turn-to-turn short circuit fault of synchronous generator is an urgent problem for those skilled in the art.

SUMMARY

In view of the above, the present disclosure provides a detection system and method for rotor dynamic turn-to-turn short circuit fault of synchronous generator, which identifies and locates the rotor winding dynamic turn-to-turn short circuit fault of synchronous generator through the three-phase current signal of stator winding and temperature signal of rotor winding, and effectively solves the problem that the detection efficiency and reliability of the existing methods are difficult to meet the requirements of practical application.

In order to achieve the above purpose, technical solutions of the present disclosure are specifically described as follows.

A first aspect of the disclosure is to provide a detection system for rotor dynamic turn-to-turn short circuit fault of synchronous generator. The system includes a motor, a synchronous generator, a current transformer, an acquisition card, an infrared temperature sensor, a temperature acquisition instrument and a control terminal. The motor is drivingly connected with the synchronous generator, three-phase taps of stator winding of the synchronous generator pass through the current transformer respectively. The current transformer is electrically connected with the acquisition card. The infrared temperature sensor is set corresponding to rotor winding of the synchronous generator. The infrared temperature sensor is electrically connected with the temperature acquisition instrument. The acquisition card and the temperature acquisition instrument are electrically connected with the control terminal.

The current transformer measures a three-phase current signal of the stator winding of the synchronous generator in real time, and transmits the three-phase current signal of the stator winding to the control terminal through the acquisition card.

The infrared temperature sensor measures a temperature signal of the rotor winding of the synchronous generator in real time, and transmits the temperature signal of the rotor winding to the control terminal through the temperature acquisition instrument.

The control terminal converts the three-phase current signal of the stator winding into a spectrum signal, compares different spectrum components of the spectrum signal with corresponding spectrum components of a normal three-phase current of the stator winding, and compares the temperature signal of the rotor winding with a normal temperature data sample of the rotor winding. When it is determined that the three-phase current signal of the stator winding and the temperature signal of the rotor winding are abnormal, the control terminal outputs a rotor winding dynamic turn-to-turn short circuit fault signal. And the control terminal also determines a location of the rotor winding dynamic turn-to-turn short circuit fault according to a rotor winding number corresponding to the abnormal temperature signal of the rotor winding.

In order to realize fault location, after aligning the infrared temperature sensor with the rotor winding, the rotor winding needs to be numbered according to the rotor rotation direction, and the fault location is judged according to the number of the rotor winding where the abnormal temperature signal is located in the later stage, so as to realize efficient and accurate fault location.

Further, the control terminal is a personal computer (PC). The PC is composed of hardware system and software system. It is a kind of equipment that can run independently and complete specific functions. It can be used as the control terminal of the system to realize the core functions such as data sending and receiving, data analysis and processing.

Further, a judgment basis for an abnormality of the three-phase current signal of the stator winding is that a fundamental frequency current and a triple frequency current of the spectrum signal corresponding to the three-phase current signal of the stator winding decrease, a double frequency current and a quadruple frequency current increase, and a time domain signal of the three-phase current signal of the stator winding appears obvious "spike".

A judgment basis for an abnormality of the temperature signal of the rotor winding is that a rotor winding temperature increases.

According to the above judgment basis, the three-phase current signal of stator winding and the temperature signal of rotor winding can be used to accurately judge and locate the rotor winding dynamic turn-to-turn short circuit fault.

A second aspect of the disclosure is to provide a detection method for rotor dynamic turn-to-turn short circuit fault of synchronous generator. The method includes the following steps.

A three-phase current signal of stator winding of synchronous generator is collected.

The rotor winding of synchronous generator is numbered according to a rotor rotation direction, and a temperature signal of the rotor winding of synchronous generator is collected.

The three-phase current signal of the stator winding is converted into a spectrum signal. Different frequency components of the spectrum signal are compared with corresponding frequency components of a normal three-phase current of the stator winding, and the temperature signal of the rotor winding is compared with a normal temperature data sample of the rotor winding. If both of the three-phase current signal of the stator winding and the temperature signal of the rotor winding are abnormal, it is determined that the synchronous generator has a rotor winding dynamic turn-to-turn short circuit fault.

A location of the rotor winding dynamic turn-to-turn short circuit fault is determined according to a rotor winding number corresponding to the abnormal temperature signal of the rotor winding.

The disclosure uses the fast Fourier transform (FFT) to convert the three-phase current signal of the stator winding into the spectrum signal, and compares the different frequency components of the spectrum signal with the time domain diagram of the normal three-phase current of the stator winding and the samples of each frequency multiplication component. It can quickly determine whether the three-phase current signal of the stator winding is abnormal through the change relationship of the data.

Further, a judgment basis for an abnormality of the three-phase current signal of the stator winding is that a fundamental frequency current and a triple frequency current of the spectrum signal corresponding to the three-phase current signal of the stator winding decrease, a double frequency current and a quadruple frequency current increase, and a time domain signal of the three-phase current signal of the stator winding appears obvious "spike".

A judgment basis for an abnormality of the temperature signal of the rotor winding is that a rotor winding temperature increases.

Further, an obtaining process of the corresponding frequency components of a normal three-phase current of the stator winding and the normal temperature data sample of the rotor winding specifically includes the following steps.

The three-phase current of the stator winding and the temperature of the rotor winding are measured respectively correspondingly under a normal working condition of the synchronous generator, and multiple groups of normal three-phase currents of stator winding and normal temperature data of the rotor winding are obtained.

The normal three-phase current of stator winding is converted into a frequency spectrum signal, and characteristics and amplitudes of fundamental to quadruple frequency currents are extracted to obtain the corresponding frequency components of the normal three-phase current of the stator winding.

An average value of the normal temperature data of the rotor winding is taken to obtain the normal temperature data sample of the rotor winding.

In the disclosure, the synchronous generator under a normal working condition means that after the assembly and commissioning of the synchronous generator, all indexes tend to be in normal state. The data obtained at this time are used as standard data.

According to the above technical scheme, compared with the prior art, the disclosure provides a detection system and method for rotor dynamic turn-to-turn short circuit fault of synchronous generator. The infrared temperature sensor has the characteristics of sensitive acquisition of rotor winding temperature and non-contact measurement, and the rotor winding produces obvious temperature rise during dynamic turn-to-turn short circuit. The rotor winding dynamic turn-to-turn short circuit fault of synchronous generator is detected and located by measuring the double judgment standards of the temperature signal of rotor winding and the three-phase current signal of stator winding. The method is easy to operate and has high sensitivity. The detection and location process of the fault is efficient and reliable. The dynamic turn-to-turn short circuit fault can be detected in the early stage of the formation of rotor static turn-to-turn short circuit, so as to reduce the loss of power plant fault shutdown and better meet the needs of practical application.

BRIEF DESCRIPTION OF THE DRAWINGS

In order to explain the embodiments of the present disclosure or the technical solutions in the prior art more clearly, the following drawings that need to be used in the description of the embodiments or the prior art will be briefly introduced. Obviously, the drawings in the following description are only embodiments of the present disclosure. For those of ordinary skill in the art, other drawings can be obtained based on the drawings disclosed without creative work.

DETAILED DESCRIPTION OF THE EMBODIMENTS

The technical scheme in the embodiments of the disclosure will be clearly and completely described below in combination with the accompanying drawings in the embodiment of the disclosure. Obviously, the described embodiments are only part of the embodiments of the disclosure, not all of them. Based on the embodiments of the disclosure, all other embodiments obtained by ordinary technicians in the art without making creative work belong to the protection scope of the disclosure.

Figure 1:
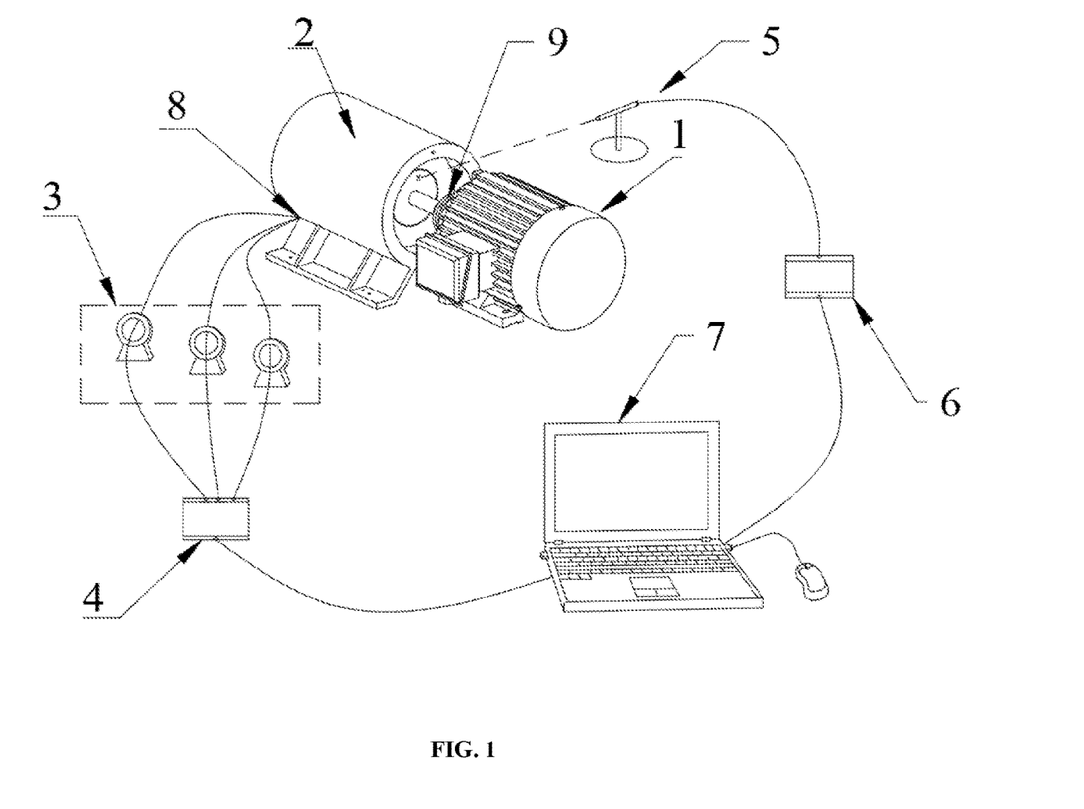
FIG. 1 is a structural diagram of a detection system for rotor dynamic turn-to-turn short circuit fault of synchronous generator provided by the disclosure.

On the one hand, referring to FIG. 1, the embodiment of the disclosure discloses a detection system for rotor dynamic turn-to-turn short circuit fault of synchronous generator, which includes: motor 1, synchronous generator 2, current transformer 3, acquisition card 4, infrared temperature sensor 5, temperature acquisition instrument 6 and control terminal 7. The motor 1 is drivingly connected with the synchronous generator 2 through a coupling 9, and the three-phase taps 8 of the stator winding of the synchronous generator 2 passes through the current transformers 3 respectively. In this embodiment, the current transformer is provided with three. The three current transformers 3 are electrically connected with the acquisition card 4. The infrared temperature sensor 5 is aligned with the rotor winding of the synchronous generator 2. The infrared temperature sensor 5 is electrically connected with the temperature collector 6. The acquisition card 4 and the temperature acquisition instrument 6 are electrically connected with the control terminal 7.

The current transformers 3 measure a three-phase current signal of the stator winding of the synchronous generator 2 in real time, collects and records the three-phase current signal of the stator winding through the acquisition card 4, and then transmits it to the control terminal 7.

The infrared temperature sensor 5 measures a temperature signal of the rotor winding of the synchronous generator in real time, and continuously records the temperature at the time of the whole rotation cycle of the rotor, that is, the temperature of the rotor winding after the whole rotation cycle. And so on, the temperature of each winding at different rotation cycle times can be measured, the temperature signal of the infrared temperature sensor 5 can be received by connecting the temperature acquisition instrument 6, and the temperature signal of the rotor winding can be transmitted to the control terminal 7.

The control terminal 7 converts the three-phase current signal of the stator winding into a spectrum signal, compares different spectrum components of the spectrum signal with corresponding spectrum components of a normal three-phase current of the stator winding, and compares the temperature signal of the rotor winding with a normal temperature data sample of the rotor winding. When it is determined that both of the three-phase current signal of the stator winding and the temperature signal of the rotor winding are abnormal, the control terminal 7 outputs a rotor winding dynamic turn-to-turn short circuit fault signal. And the control terminal 7 also determines a location of the rotor winding dynamic turn-to-turn short circuit fault according to a rotor winding number corresponding to the abnormal temperature signal of the rotor winding.

In this embodiment, the control terminal 7 is a PC, and the temperature signal in the temperature acquisition instrument 6 and the current signal in the acquisition card 4 can be transmitted to the upper computer through connecting the PC for unified processing.

Specifically, in the system disclosed in the embodiment, a judgment basis for an abnormality of the three-phase current signal of the stator winding is that the fundamental frequency current and a triple frequency current of the spectrum signal corresponding to the three-phase current signal of the stator winding decrease, a double frequency current and a quadruple frequency current increase, and a time domain signal of the three-phase current signal of the stator winding appears obvious "spike". And the judgment basis for an abnormality of the temperature signal of the rotor winding is that a rotor winding temperature increases.

Figure 2:
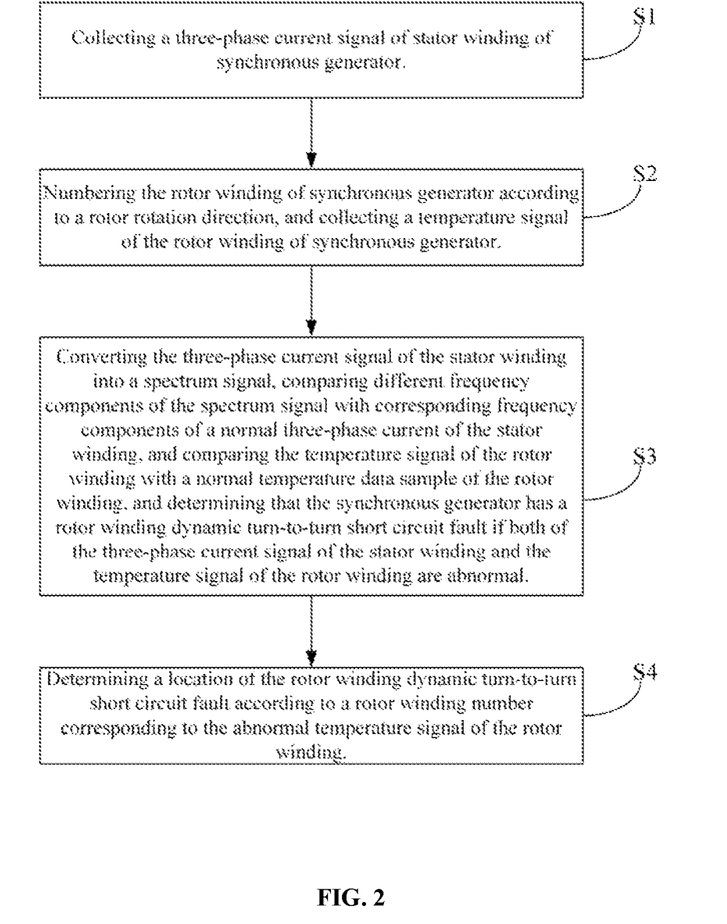
FIG. 2 is the implementation flow diagram of a detection method for rotor dynamic turn-to-turn short circuit fault of synchronous generator provided by the disclosure.
Figure 3:
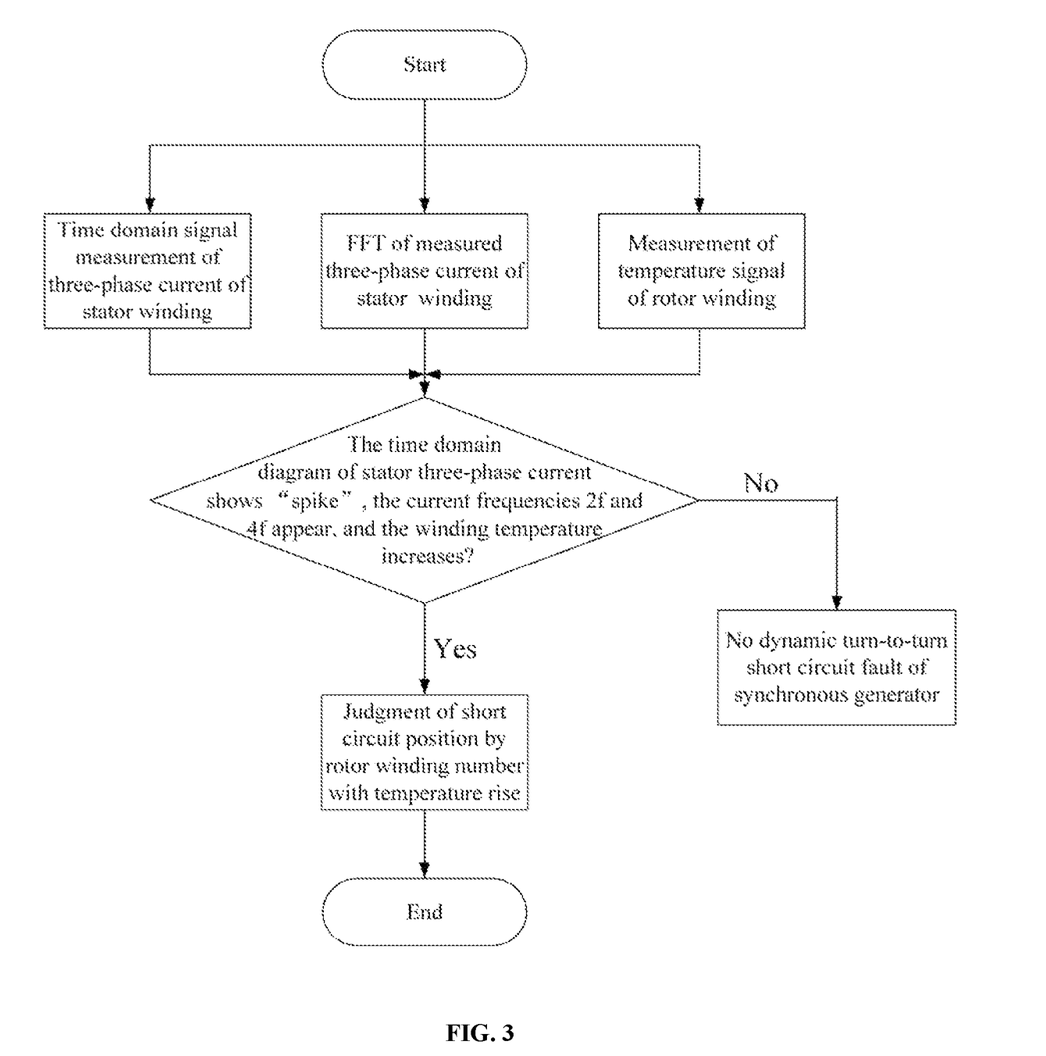
FIG. 3 is the schematic diagram of the realization principle of the detection method for rotor dynamic turn-to-turn short circuit fault of synchronous generator.

On the other hand, referring to FIG. 2 and FIG. 3, the embodiment of the disclosure also discloses a detection method for rotor dynamic turn-to-turn short circuit fault of synchronous generator, which includes the following steps.

S1: collecting a three-phase current signal of stator winding of synchronous generator.

Corresponding to the above system, the three-phase current signal of stator winding is collected by the current transformers.

Figure 4:
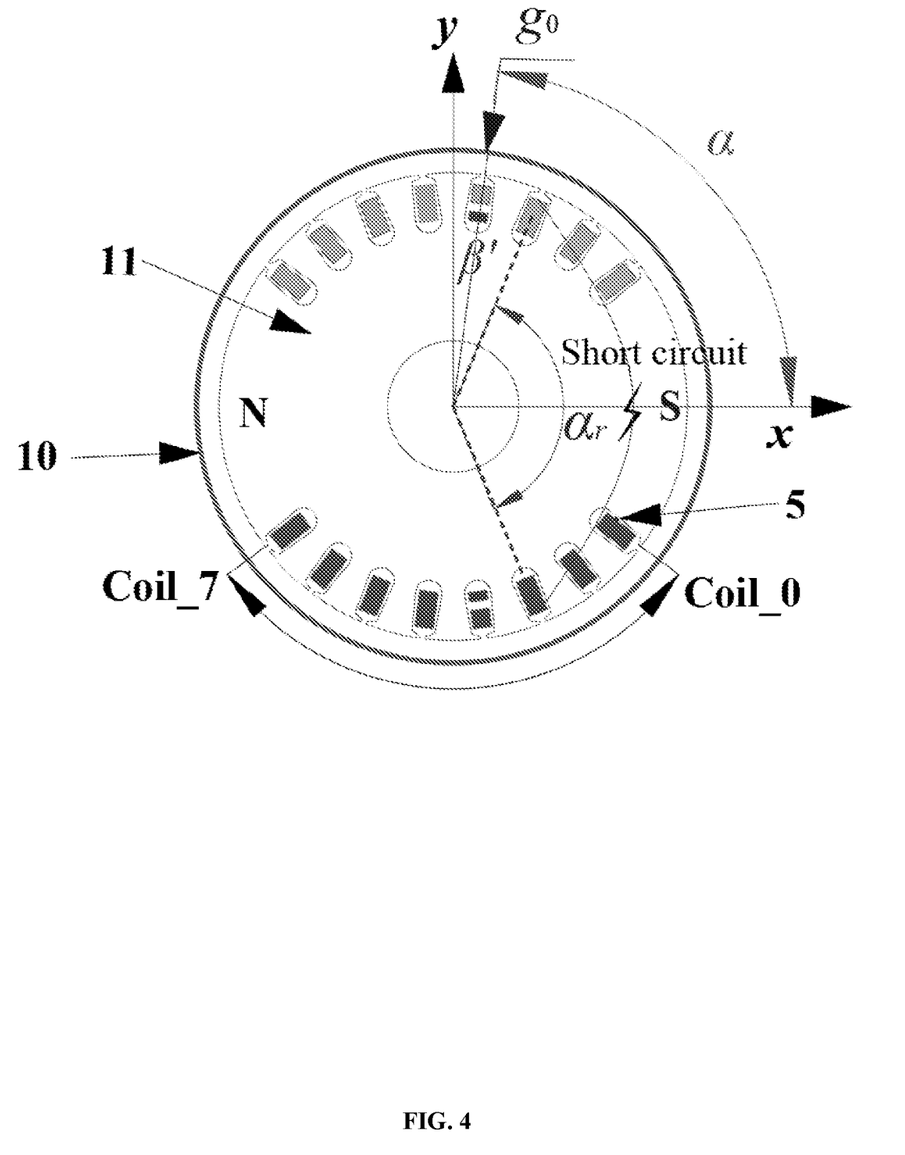
FIG. 4 is a schematic diagram of numbering the rotor winding of a synchronous generator according to the rotor rotation direction.

S2: numbering the rotor winding of synchronous generator according to a rotor rotation direction, and collecting a temperature signal of the rotor winding of synchronous generator As shown in FIG. 4, the stator 10 and rotor 11 are shown. The infrared temperature sensor 5 is aligned with the rotor winding, and the rotor winding is named according to the rotor rotation direction in turn. Take the temperature of the first rotor winding as an example, that is, the temperature of the rotor winding after the rotation integer cycle can be obtained by measuring the temperature again after the rotation integer cycle, and so on. In FIG. 4, N and S respectively represent the two poles of rotor excitation, $\alpha_r$ represents the included angle between the two slots where the short-circuit turn is located, $\alpha$ represents the mechanical angle under the stator coordinate, $\beta'$ represents the slot position angle where the short-circuit turn is located, and $g_0$ represents the radial air gap length. Coil_0-Coil_7 are named in clockwise order, which are Coil_0, Coil_1, Coil_2, Coil_3, Coil_4, Coil_5, Coil_6, Coil_7 respectively. The same method is used to measure the temperature of the rotor winding after numbering.

S3: converting the three-phase current signal of the stator winding into a spectrum signal, comparing different frequency components of the spectrum signal with corresponding frequency components of a normal three-phase current of the stator winding, and comparing the temperature signal of the rotor winding with a normal temperature data sample of the rotor winding, and determining that the synchronous generator has a rotor winding dynamic turn-to-turn short circuit fault if both of the three-phase current signal of the stator winding and the temperature signal of the rotor winding are abnormal.

Specifically, in this embodiment, the three-phase current signal of the stator winding is converted into a spectrum signal by fast Fourier transform. The judgment basis for an abnormality of the three-phase current signal of the stator winding is that a fundamental frequency current and a triple frequency current of the spectrum signal corresponding to the three-phase current signal of the stator winding decrease, a double frequency current and a quadruple frequency current increase, and a time domain signal of the three-phase current signal of the stator winding appears obvious "spike". The judgment basis for an abnormality of the temperature signal of the rotor winding is that a rotor winding temperature increases.

Specifically, an obtaining process of the corresponding frequency components of a normal three-phase current of the stator winding and the normal temperature data sample of the rotor winding specifically includes the follow steps.

After the commissioning of the synchronous generator assembly machine and all indexes tend to be normal, the current transformers and infrared temperature sensor are used to measure the three-phase current of stator winding and the temperature of rotor winding respectively, and multiple groups of data of normal three-phase current of stator winding and normal temperature of rotor winding can be measured. The normal three-phase current of stator winding is transformed into frequency spectrum signal by FFT algorithm, and the characteristics and amplitude of fundamental to quadruple frequency current are extracted to obtain the time domain diagram of normal three-phase current of stator winding and the samples of each frequency multiplication component. The normal temperature signal of rotor winding is averaged to obtain the normal temperature data sample of rotor winding.

S4: determining a location of the rotor winding dynamic turn-to-turn short circuit fault according to a rotor winding number corresponding to the abnormal temperature signal of the rotor winding.

Based on the existing rotor static turn-to-turn short circuit, the disclosure makes a theoretical analysis on the dynamic short circuit. The theoretical analysis process of three-phase current of stator winding under rotor winding dynamic turn-to-turn short circuit fault of synchronous generator is as follows.

In this embodiment, the rotor dynamic short circuit fault process is equivalent to adding a reverse pulse current to the normal stator three-phase winding current, while the static short circuit can be equivalent to adding a reverse step current signal to the normal stator winding three-phase current. Accordingly, the expression of stator winding current under normal, static turn-to-turn short circuit and dynamic turn-to-turn short circuit can be further written as:

$$I(\alpha, t) = \begin{cases} \left[\sum_{n=1,3,5...}^{\infty} F_n \cos(n\omega t - p\alpha)\right] l v \Lambda_0/Z \cdots \text{normal} \\ \left[\sum_{n=1,3,5...}^{\infty} F_n \cos(n\omega t - p\alpha) - \sum_{m=1,2,3...}^{\infty} F_{dm} \cos(m\omega t - p\alpha)\right] l v \Lambda_0/Z \ldots \text{static turn to turn short circuit} \\ \left[\sum_{n=1,3,5...}^{\infty} F_n \cos(n\omega t - p\alpha)\right] l v \Lambda_0/Z \cdots (i-1)T < t < (i-1+k)T \\ \Delta h_1 l v \Lambda_0/Z \cdots t = (i-1+k)T \\ \left[\sum_{n=1,3,5...}^{\infty} F_n \cos(n\omega t - p\alpha) - \sum_{m=1,2,3...}^{\infty} F_{dm} \cos(m\omega t - p\alpha)\right] l v \Lambda_0/Z \cdots (i-1+k)T < t < iT \\ \Delta h_2 l v \Lambda_0/Z \cdots t = (i-1+k)T \\ \cdots \text{dymanic turn to turn short circuit} \end{cases}$$

Where, α is the mechanical angle under the stator coordinate, t is the generator operation time, $F_n$ is the n-th harmonic amplitude, n is all odd numbers starting from 1, ω is the rotor rotation angular speed, p is the number of poles of the generator, l is the length of armature winding cut by the magnetic induction line generated by the excitation winding, v is the linear speed of magnetic field rotation, $F_{dm}$ the amplitude of m-th harmonic generated after short circuit, m is all natural numbers, Z is the reactance of single-phase winding, T is the dynamic turn-to-turn short circuit period, $h_1$ is the magnetic potential pulse generated when the normal state is converted to the short circuit state, $h_2$ is the magnetic potential pulse generated when the short circuit is converted to the normal state, and k is the duty ratio of the normal part in a dynamic turn-to-turn short circuit cycle.

It can be seen from the above formula that the current of stator winding under dynamic turn-to-turn short circuit fault mainly depends on the air gap magnetic density and rotor speed after short circuit. The short circuit degree of dynamic turn-to-turn short circuit is generally small, resulting in little change in speed. For the convenience of analysis, in this embodiment, the rotor speed is regarded as unchanged.

Correspondingly, compared with the normal state, the stator winding current under rotor dynamic turn-to-turn short circuit adds even harmonics in addition to the original odd harmonics. With the aggravation of dynamic short circuit, the effective value of stator winding current decreases. In the dynamic short circuit cycle, an infinite pulse signal appears at the moment when the two states of short circuit and normal are transformed. However, due to the differences between theoretical analysis and simulation experiments, the infinite pulse signal appears in the form of "spike" signal in the simulation experiment. From the above analysis, it can be seen that at the moment of transition from normal to short circuit state, there is a "spike" that reduces the current amplitude, and at the moment of transition from short circuit to normal state, there is a "spike" that increases the current amplitude, and the absolute value of the "spike" increases with the aggravation of dynamic short circuit. In the overall amplitude of current, the effective value of current under dynamic turn-to-turn short circuit fault is between normal and static short circuit.

Figure 5:
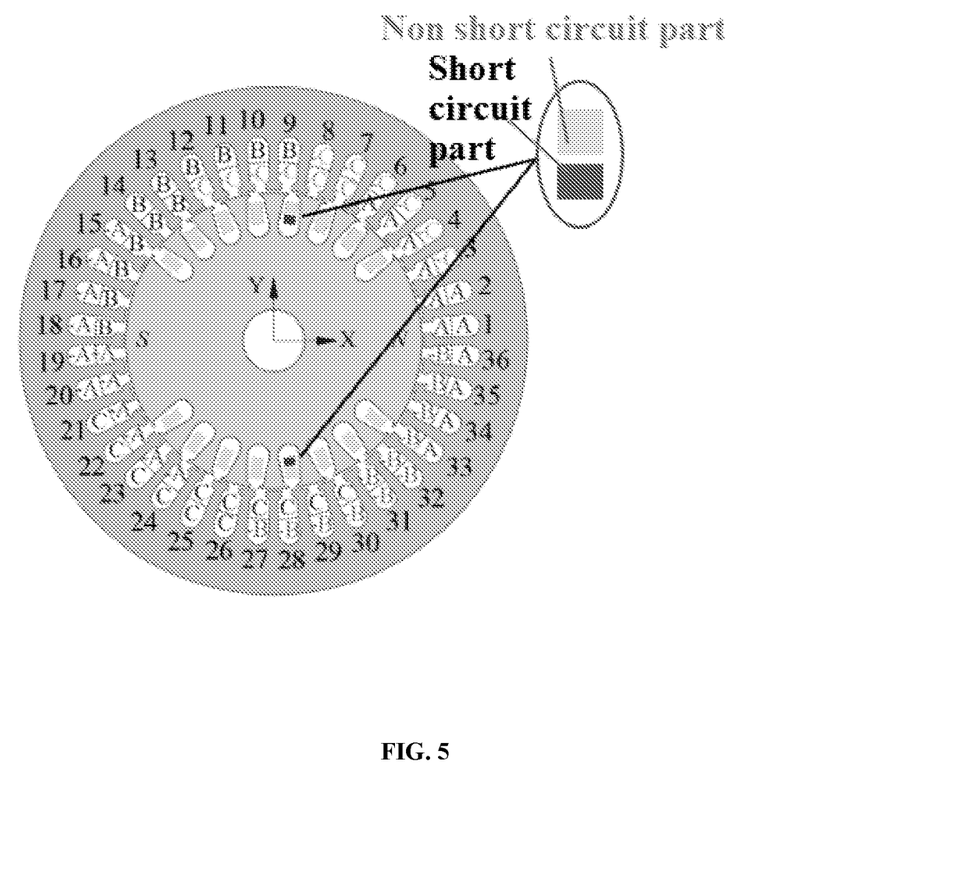
FIG. 5 is a schematic diagram of two-dimensional finite element modeling model of synchronous generator.

As shown in FIG. 5, FIG. 6, FIG. 7, FIG. 8 and FIG. 9, the finite element modeling of synchronous generator is carried out, and the finite element calculation and experimental verification of dynamic and static turn-to-turn short circuit are carried out. The established finite element calculation model is shown in FIG. 5.

Figure 6:
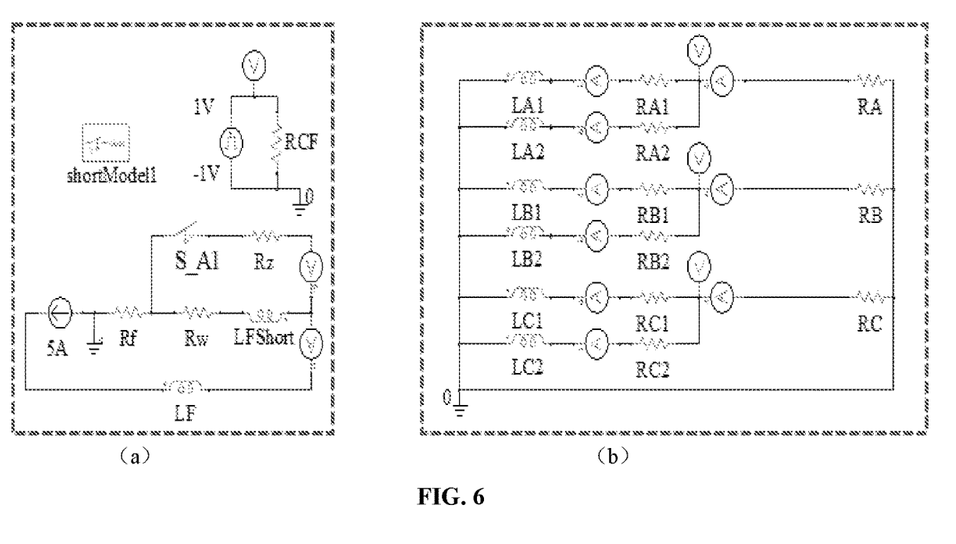
FIG. 6 is a schematic diagram of external coupling circuit for finite element simulation of the rotor winding dynamic turn-to-turn short circuit of synchronous generator.

In order to make the setting of dynamic turn-to-turn short circuit of generator in the process of finite element calculation the same as the experiment, this embodiment uses the coupling method of physical model and external circuit to simulate the fault. The external coupling circuit of the motor excitation winding (i.e. rotor winding) is shown in FIG. 6 (a), in which S-A1 is the short circuit trigger switch and ShortModel1 is the switch control module. The trigger control of the short circuit switch is realized by setting the trigger voltage interval $[V_{on}, V_{off}]$ and cooperating with the pulse voltage source. The external coupling circuit of armature winding (i.e. stator winding) is shown in FIG. 6 (b). In the process of finite element calculation, the fault simulation of different short circuit degrees is realized by changing the turns of normal winding LF and short circuit winding LFshort in the external circuit and the resistance values of corresponding resistors Rw and Rf.

Figure 7:
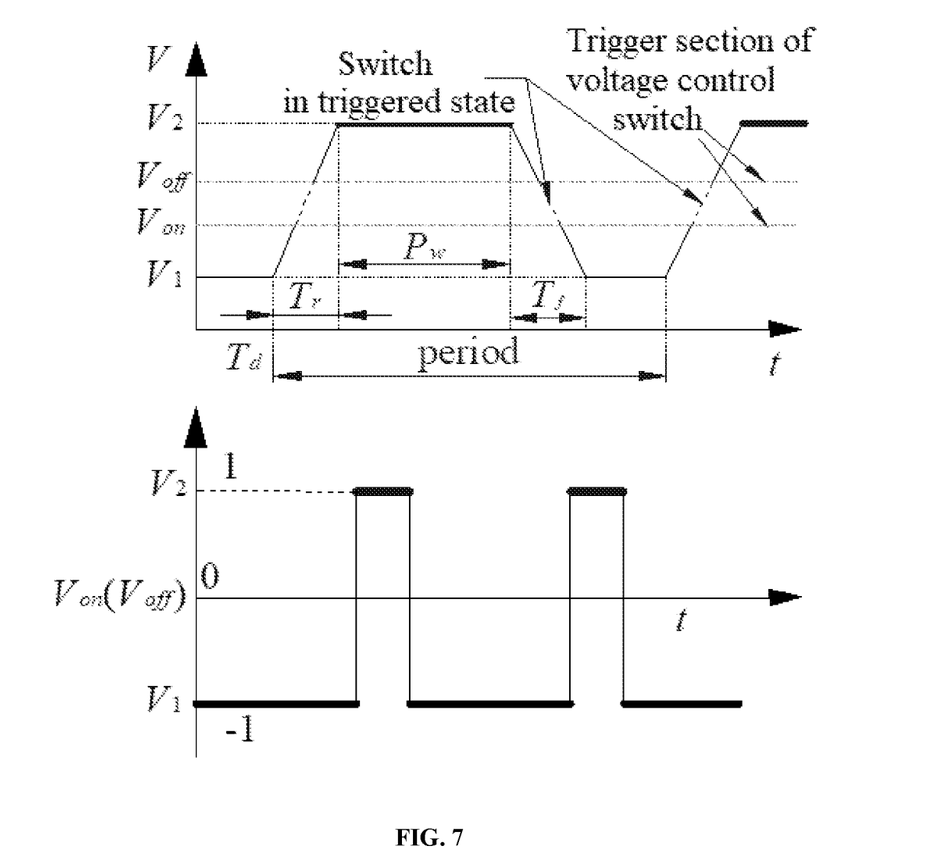
FIG. 7 is a timing diagram of the trigger voltage of the short circuit switch in the external coupling circuit of the finite element simulation of the rotor winding dynamic turn-to-turn short circuit of the synchronous generator.

The pulse time setting during dynamic turn-to-turn short circuit is shown in FIG. 7. In FIG. 7, $T_d$ is the delay time, $T_r$ is the rise time, $T_f$ is the fall time, $P_w$ is the pulse width and Period is the pulse period. $V_{on}$ is the trigger voltage of the voltage-controlled switch. When the voltage value of the pulse voltage source is greater than $V_{on}$, the switch S_A1 acts, that is, the excitation circuit is short circuited. $V_{off}$ represents the cut-off voltage of the voltage-controlled switch. When the voltage value of the pulse voltage source is less than $V_{off}$, the switch S_A1 is disconnected, that is, the excitation circuit is normal. By adjusting $P_w$ and Period, the duty ratio of the short circuit part and the frequency of dynamic short circuit are changed. By setting the above parameters, the external circuit of dynamic turn-to-turn short circuit with a period of 20 ms and a duty ratio of 15% of the short circuit part is generated, which is the same as the setting used in the experiment.

Figure 8:
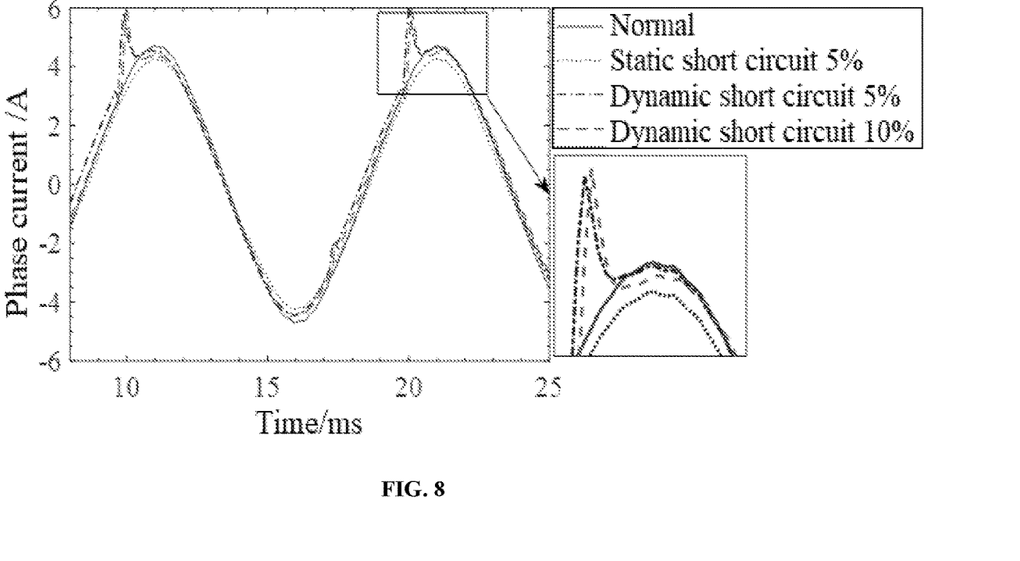
FIG. 8 is the time domain result of finite element simulation of stator winding current under rotor winding dynamic turn-to-turn short circuit of synchronous generator.

The finite element analysis and calculation of synchronous generator are carried out through the above methods. The finite element calculation results of stator phase current change before and after short circuit are shown in FIG. 8. It can be seen from FIG. 8 that after the rotor turn-to-turn short circuit fault of the generator, the effective value of the phase current is reduced compared with that under normal working conditions, showing a "compressed" state. By analyzing FIG. 8, the three curves of Normal, S-5 and D-5 can be compared. It is found that under the conditions of dynamic short circuit and static short circuit to the same extent, the current curve of dynamic short circuit is between normal and static short circuit. Compared with the normal state, at the moment when the normal and short-circuit conditions are transformed into each other, the current has a transient pulse, that is, a "spike", which increases with the aggravation of the dynamic turn-to-turn short-circuit.

Figure 9:
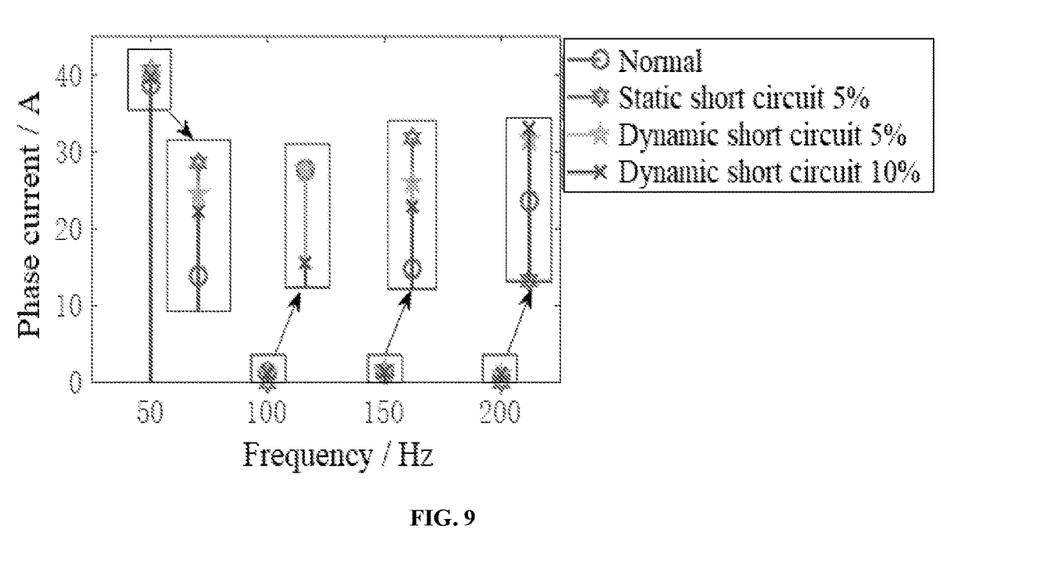
FIG. 9 is the frequency domain result of finite element simulation of stator winding current under rotor winding dynamic turn-to-turn short circuit of synchronous generator.

The frequency spectrum analysis of the stator current results obtained from the simulation is shown in FIG. 9. According to the analysis of FIG. 9, under the condition of rotor dynamic turn-to-turn short circuit, the amplitudes of fundamental wave and third harmonic components are lower than normal, and the second and fourth harmonic components appear. With the aggravation of dynamic turn-to-turn short circuit, the amplitude of fundamental and third harmonic components decreases, and the second and fourth harmonic components increase. This result is consistent with the previous theoretical analysis results of stator winding current expression under normal, static turn-to-turn short circuit and dynamic turn-to-turn short circuit.

To sum up, the embodiment of the disclosure has the following advantages compared with the existing rotor short circuit dynamic detection technology.

It can measure the temperature of rotor winding and three-phase current of stator winding in real time. The three-phase current signal of stator winding is transformed into spectrum signal by fast Fourier transform, and the different frequency components in the spectrum signal are compared with the normal three-phase current spectrum of stator winding. Combined with the time domain diagram of stator current and the temperature signal of rotor winding, it can judge whether the rotor winding dynamic turn-to-turn short circuit fault occurs in synchronous generator. If this fault exists, the infrared temperature sensor can be used to determine the short circuit position. The method provided by the disclosure is easy to operate and has high sensitivity. To a certain extent, the dynamic turn-to-turn short circuit can be detected in the early stage of the formation of the rotor static turn-to-turn short circuit, which greatly reduces the harm of the rotor short circuit fault to the operation of the power plant, fills the vacancy of the dynamic turn-to-turn short circuit fault diagnosis of the rotor winding of synchronous generator, and improves the generator fault diagnosis system.

Various embodiments in the present specification are described in a progressive manner, and the emphasizing description of each embodiment is different from the other embodiments. The same and similar parts of various embodiments can be referred to for each other. For the apparatus disclosed in the embodiments, since the apparatus corresponds to the method disclosed in the embodiments, the description is simplified, and reference may be made to the method part for description.

The above description of the disclosed embodiments enables the skilled in the art to achieve or use the disclosure. Multiple modifications to these embodiments will be apparent to those skilled in the art, and the general principles defined herein may be achieved in other embodiments without departing from the spirit or scope of the disclosure. The present disclosure will therefore not be restricted to these embodiments shown herein, but rather to comply with the broadest scope consistent with the principles and novel features disclosed herein.

What is claimed is:

1. A detection system for rotor dynamic turn-to-turn short circuit fault of synchronous generator, comprising a motor, a synchronous generator, a current transformer, an acquisition card, an infrared temperature sensor, a temperature acquisition instrument and a control terminal; wherein the motor is drivingly connected with the synchronous generator, three-phase taps of stator winding of the synchronous generator pass through the current transformer respectively, the current transformer is electrically connected with the acquisition card, the infrared temperature sensor is set corresponding to rotor winding of the synchronous generator, and the infrared temperature sensor is electrically connected with the temperature acquisition instrument, and the acquisition card and the temperature acquisition instrument are electrically connected with the control terminal;

the current transformer measures a three-phase current signal of the stator winding of the synchronous generator in real time, and transmits the three-phase current signal of the stator winding to the control terminal through the acquisition card;

the infrared temperature sensor measures a temperature signal of the rotor winding of the synchronous generator in real time, and transmits the temperature signal of the rotor winding to the control terminal through the temperature acquisition instrument; and the control terminal converts the three-phase current signal of the stator winding into a spectrum signal, compares different spectrum components of the spectrum signal with corresponding spectrum components of a normal three-phase current of the stator winding, and compares the temperature signal of the rotor winding with a normal temperature data sample of the rotor winding; when it is determined that both of the three-phase current signal of the stator winding and the temperature signal of the rotor winding are abnormal, the control terminal outputs a rotor winding dynamic turn-to-turn short circuit fault signal; and the control terminal also determines a location of the rotor winding dynamic turn-to-turn short circuit fault according to a rotor winding number corresponding to the abnormal temperature signal of the rotor winding.

2. The detection system for rotor dynamic turn-to-turn short circuit fault of synchronous generator of claim 1, wherein the control terminal is a PC.

3. The detection system for rotor dynamic turn-to-turn short circuit fault of synchronous generator of claim 1, wherein a judgment basis for an abnormality of the three-phase current signal of the stator winding is that a fundamental frequency current and a triple frequency current of the spectrum signal corresponding to the three-phase current signal of the stator winding decrease, a double frequency current and a quadruple frequency current increase, and a time domain signal of the three-phase current signal of the stator winding appears obvious "spike"; and a judgment basis for an abnormality of the temperature signal of the rotor winding is that a rotor winding temperature increases.

4. A detection method for rotor dynamic turn-to-turn short circuit fault of synchronous generator, comprising:

collecting a three-phase current signal of stator winding of synchronous generator;

numbering the rotor winding of synchronous generator according to a rotor rotation direction, and collecting a temperature signal of the rotor winding of synchronous generator;

converting the three-phase current signal of the stator winding into a spectrum signal, comparing different frequency components of the spectrum signal with corresponding frequency components of a normal three-phase current of the stator winding, and comparing the temperature signal of the rotor winding with a normal temperature data sample of the rotor winding, and determining that the synchronous generator has a rotor winding dynamic turn-to-turn short circuit fault if both of the three-phase current signal of the stator winding and the temperature signal of the rotor winding are abnormal; and determining a location of the rotor winding dynamic turn-to-turn short circuit fault according to a rotor winding number corresponding to the abnormal temperature signal of the rotor winding.

5. The detection method for rotor dynamic turn-to-turn short circuit fault of synchronous generator of claim 4, wherein a judgment basis for an abnormality of the three-phase current signal of the stator winding is that a fundamental frequency current and a triple frequency current of the spectrum signal corresponding to the three-phase current signal of the stator winding decrease, a double frequency current and a quadruple frequency current increase, and a time domain signal of the three-phase current signal of the stator winding appears obvious "spike"; and a judgment basis for an abnormality of the temperature signal of the rotor winding is that a rotor winding temperature increases.

6. The detection method for rotor dynamic turn-to-turn short circuit fault of synchronous generator of claim 4, wherein an obtaining process of the corresponding frequency components of a normal three-phase current of the stator winding and the normal temperature data sample of the rotor winding specifically comprises:

measuring the three-phase current of the stator winding and the temperature of the rotor winding respectively correspondingly under a normal working condition of the synchronous generator, and obtaining a plurality of groups of normal three-phase current of stator winding and normal temperature data of the rotor winding;

converting the normal three-phase current of stator winding into a frequency spectrum signal and extracting characteristics and amplitudes of fundamental to quadruple frequency current to obtain the corresponding frequency components of the normal three-phase current of the stator winding; and taking an average value of the normal temperature data of the rotor winding to obtain the normal temperature data sample of the rotor winding.

* * * * *